(12) United States Patent
Su et al.

(10) Patent No.: US 7,253,574 B2
(45) Date of Patent: Aug. 7, 2007

(54) EFFECTIVE SWITCHING FREQUENCY MULTIPLIER INVERTER

(75) Inventors: Gui-Jia Su, Oak Ridge, TN (US); Fang Z. Peng, Okemos, MI (US)

(73) Assignee: UT-Battelle, LLC

( * ) Notice: Subject to any disclaimer, the term of this patent is extended or adjusted under 35 U.S.C. 154(b) by 0 days.

(21) Appl. No.: 11/173,344

(22) Filed: Jul. 1, 2005

(65) Prior Publication Data
US 2007/0001633 A1    Jan. 4, 2007

(51) Int. Cl.
*H02K 21/00* (2006.01)
(52) U.S. Cl. .................. 318/254; 318/138; 318/439; 318/700; 318/800
(58) Field of Classification Search ................ 318/138, 318/254, 439, 700–800, 801–822
See application file for complete search history.

(56) References Cited

U.S. PATENT DOCUMENTS

| | | | | |
|---|---|---|---|---|
| 3,213,343 A | * | 10/1965 | Sheheen .................... | 388/829 |
| 4,291,259 A | * | 9/1981 | Marumoto et al. ......... | 318/139 |
| 6,232,731 B1 | * | 5/2001 | Chapman .................... | 318/801 |
| 6,324,085 B2 | * | 11/2001 | Kimura et al. .............. | 363/132 |
| 6,583,992 B2 | | 6/2003 | Porter et al. | |

OTHER PUBLICATIONS

J.W. Dixon and B. T. OOI, "Series and Parallel Operation of Hysteresis Current-Controlled PWM Rectifiers," IEEE Transactions on Ind. Appl, 1989, pp. 644-651, vol. 25, No. 4.
N. Seki and H. Uchino, "Which is Better at a High Power Reactive Compensation System . . . ," IEEE Ind. Appl. Soc. Annua. Meeting Conf. Record, 1994, pp. 946-953, vol. 2.
T.T. Koganezawa, et al., "A Super High Speed PM Motor Drive System by a Quasi- Current Source Inverter," IEEE Transactions on Ind Appl, 1994, pp. 683-690, vol. 30, No. 3.
S. Vukosavid and V.R. Stefanovic, "SRM Inverter Topologies: A Comparative Evaluation," IEEE Transactions of Ind Appl, 1991, pp. 1034-1047, vol. 27, No. 6.

* cited by examiner

*Primary Examiner*—Lincoln Donovan
*Assistant Examiner*—Tyrone Smith
(74) *Attorney, Agent, or Firm*—Kirk A. Wilson

(57) ABSTRACT

A switching frequency multiplier inverter for low inductance machines that uses parallel connection of switches and each switch is independently controlled according to a pulse width modulation scheme. The effective switching frequency is multiplied by the number of switches connected in parallel while each individual switch operates within its limit of switching frequency. This technique can also be used for other power converters such as DC/DC, AC/DC converters.

12 Claims, 8 Drawing Sheets

EFFECTIVE SWITCHING FREQUENCY MULTIPLIER INVERTER

STATEMENT REGARDING FEDERALLY SPONSORED RESEARCH

This invention was made with United States Government support under Contract No. DE-AC05-00OR22725 between the United States Department of Energy and U. T. Battelle, LLC. The United States Government has certain rights in this invention.

FIELD OF THE INVENTION

This invention is in the field of power electronics and specifically teaches a device for multiplying the effective switching frequency of a power inverter.

BACKGROUND OF THE INVENTION

FIG. 1(a) shows a typical adjustable speed drive configuration, where a bridge inverter consisting of six switching devices is used to supply an adjustable voltage of controlled frequency to a three phase Permanent Magnet (PM) motor. For PM motors having sinusoidal back electromotive force (EMF), a sinusoidal current is required to best mach the back EMF. A rectangular wave current is required for brushless direct current (BLDC) motors that have trapezoidal back EMFs. The actual current that the inverter can produce by means of pulse width modulation (PWM) contains harmonic components in addition to the required frequency component due to IGBT's limited switching frequency. The harmonic components in the motor currents appear as ripples and increase as the motor inductance decreases. The current ripple may become unacceptably large as the motor inductance decreases below certain values. The high current ripple also causes additional copper and iron losses in the motor. Other semiconductor devices such as metal-oxide semiconductor field effect transistor (MOSFET) that are capable of switching at higher frequency can not meet the voltage and/or current requirements for the high power PM motors (greater than 10 kWs).

One traditional and obvious way to limit current ripple is to add external inductance as shown in FIG. 1(b). For BLDC motor drives a quasi-current source inverter was proposed, as shown in FIG. 1(c), in which a step-down chopper consisting of a switch, a diode and an inductor is inserted into the DC bus. The chopper regulates the motor current by pulse width modulation (PWM) while the bridge inverter operates in a six-step manner with each device conducting a fixed period of 120 electrical degrees. This topology can reduce the number of external inductors as compared to the previous one. Other existing ways include the series or parallel connection of multiple modular inverters through transformer or inductor coupling, in which special arrangements of transformer windings and/or phase displacement in PWM carriers between the modular inverters are used to eliminate the lower order harmonic components, thus reducing the current ripple and effectively increasing the switching frequency. Disadvantages of adding inductors or transformers include that they are bulky, heavy and require large additional installation space.

These problems can be overcome in this invention by increasing the inverter effective switching frequency while maintaining each individual device switching within its limited capability.

BRIEF DESCRIPTION OF THE INVENTION

In power electronic systems such as adjustable speed motor drives (ASD), current control loop bandwidth and current ripple are related to switching frequency. Generally in ASD systems, system control response increases but current ripple decreases proportionally to the inverter switching frequency. The current ripple is also inversely proportional to the machine impedance, mainly the inductance.

As motor state inductance is getting lower and lower as seen in the recent permanent magnet (PM) machines, such low inductance PM machines driven by a standard bridge inverter with the most commonly used semiconductor switching device, the insulated gate bipolar transistor (IGBT) may produce unacceptable current ripple due to IGBT's limited switching frequency.

In order to reduce current ripple, a switching frequency multiplier inverter for low inductance machines is taught in this invention. The inverter uses parallel connection of switches and each switch is independently controlled according to a pulse width modulation scheme. The effective switching frequency is multiplied by the number of switches connected in parallel while each individual switch operates within its limit of switching frequency. This technique can also be used for other power converters such as DC/DC, AC/DC converters.

DETAILED DESCRIPTION OF THE INVENTION

Figure 1A:
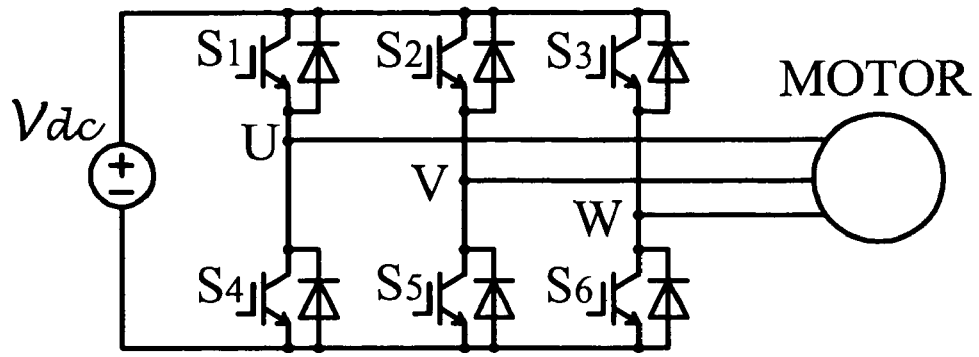
FIG. 1(a) is a standard adjustable speed drive circuit.
Figure 1B:
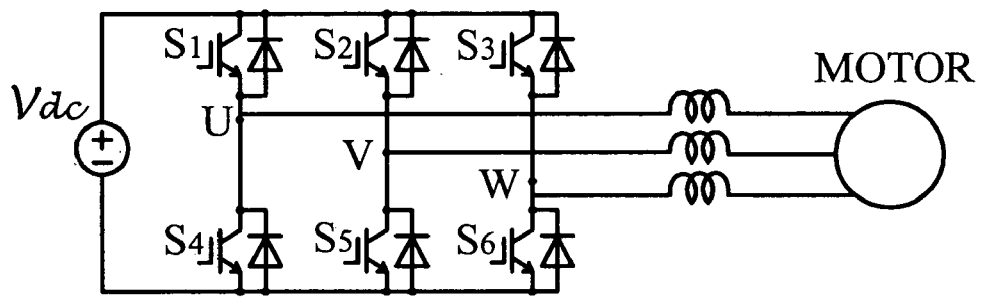
FIG. 1(b) is a standard adjustable speed drive circuit with external inductance.
Figure 1C:
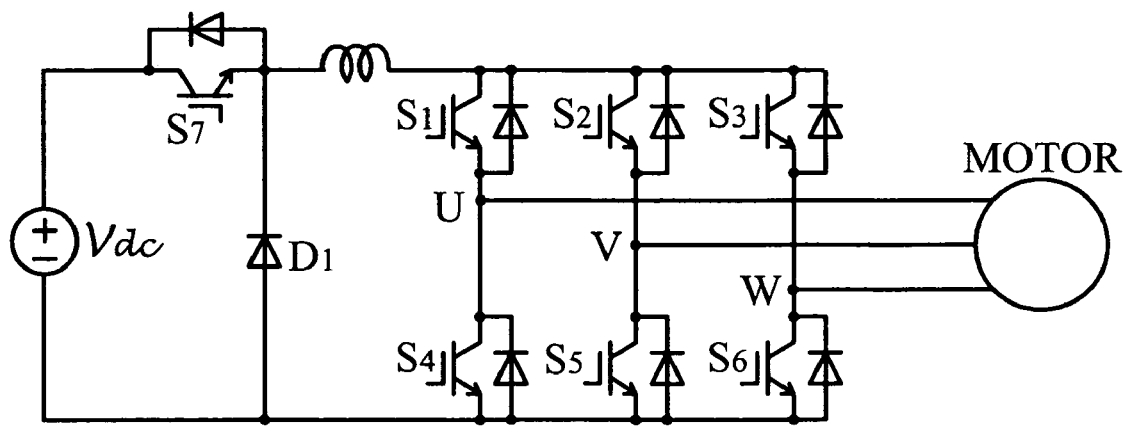
FIG. 1(c) is a brushless DC motor drive circuit.
Figure 2:
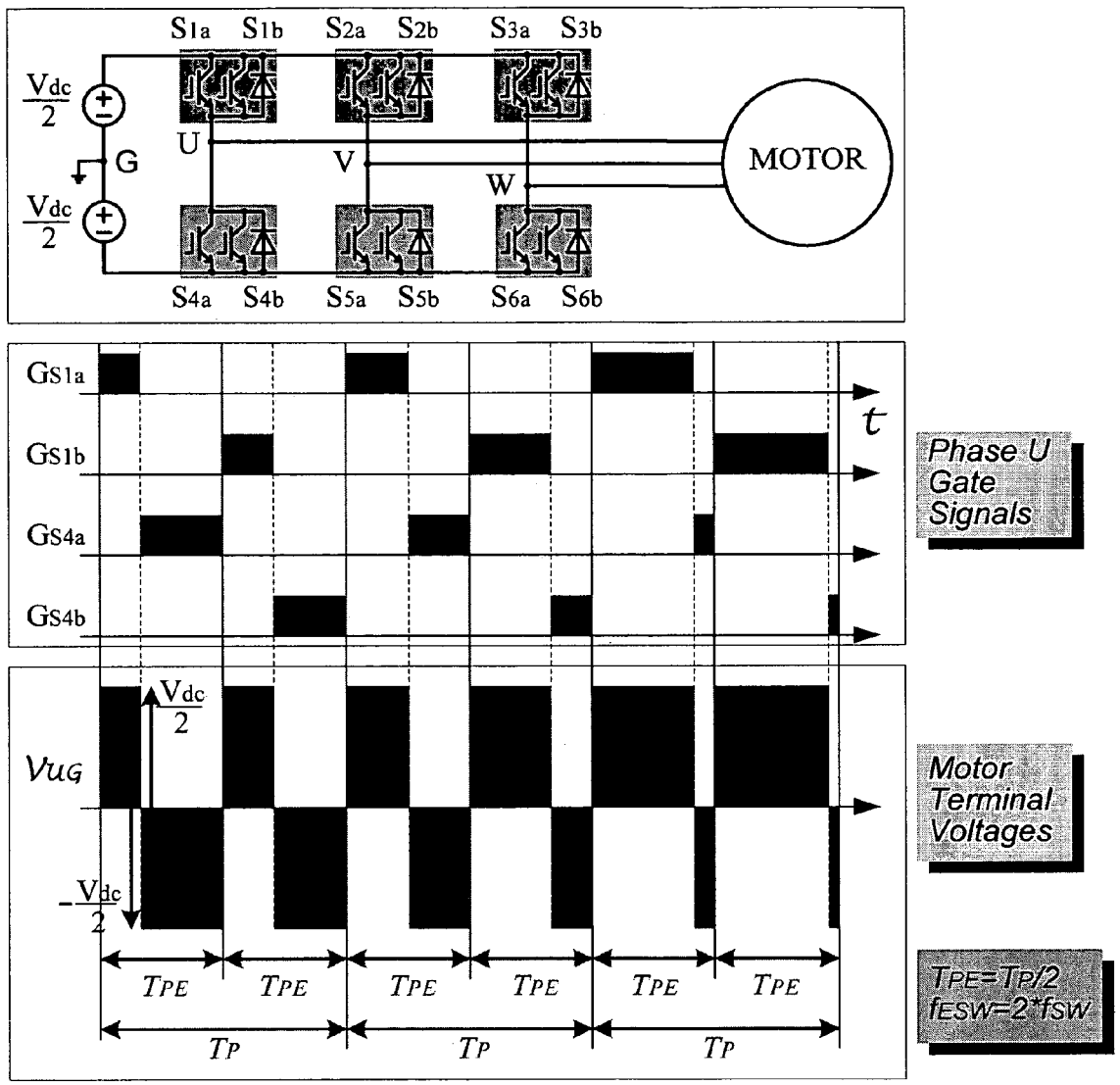
FIG. 2 is an example of the invention for a three-phase inverter for motor drive.

An example of a three-phase inverter that doubles the effective switching frequency is shown in FIG. 2. The inverter has the same structure as a standard three-phase bridge inverter except that it uses two switching devices connected in parallel for each of the six legs and the two do not conduct at the same time. The operating principle of the proposed inverter can be explained by referring to the operating waveforms for phase leg U, also shown in the same figure, where $G_{S1a}$, $G_{S1b}$, $G_{S4a}$ and $G_{S4b}$ represent the gate control signals, and $V_{UG}$ is motor phase U terminal voltage, respectively. Switches $S_{1a}$ and $S_{4a}$, $S_{1b}$ and $S_{4b}$ work as two pairs that functions in the same way as a phase leg pair in a standard bridge inverter. An essential feature of the invention is that the two pairs of switches on each phase-leg conduct alternately and share one half of the duty for a PWM control period, $T_p$. As a result, the effective switching period, $T_{PE}$, is reduced to $T_p/2$, i.e. the effective switching frequency is doubled for motor voltage and current even though the switching frequency of each individual device remains unchanged, as can be seen from the motor terminal voltage. An inverter having this essential feature is referred to as a bipolar PWM inverter if the upper and lower switches of a phase leg switch in a complementary way as illustrated in the FIG. 2, or otherwise unipolar PWM inverter.

While FIG. 2 shows an example where just one additional device is added to each original one in a standard bridge inverter, more devices can be added thus further increasing the effective switching frequency. As a general rule, the effective switching frequency is multiplied by the number of devices that one puts in parallel for each of the six legs. There is a limit on the number of devices that can be put in parallel due to the minimum conduction duration for a particular switching device. One feature about this topology is that all the switching devices can be put into a single integrated module; thus without significantly increasing the complexity of the inverter circuitry. Existing six-pack or dual IGBT modules can be used with minor modifications.

Figure 3:
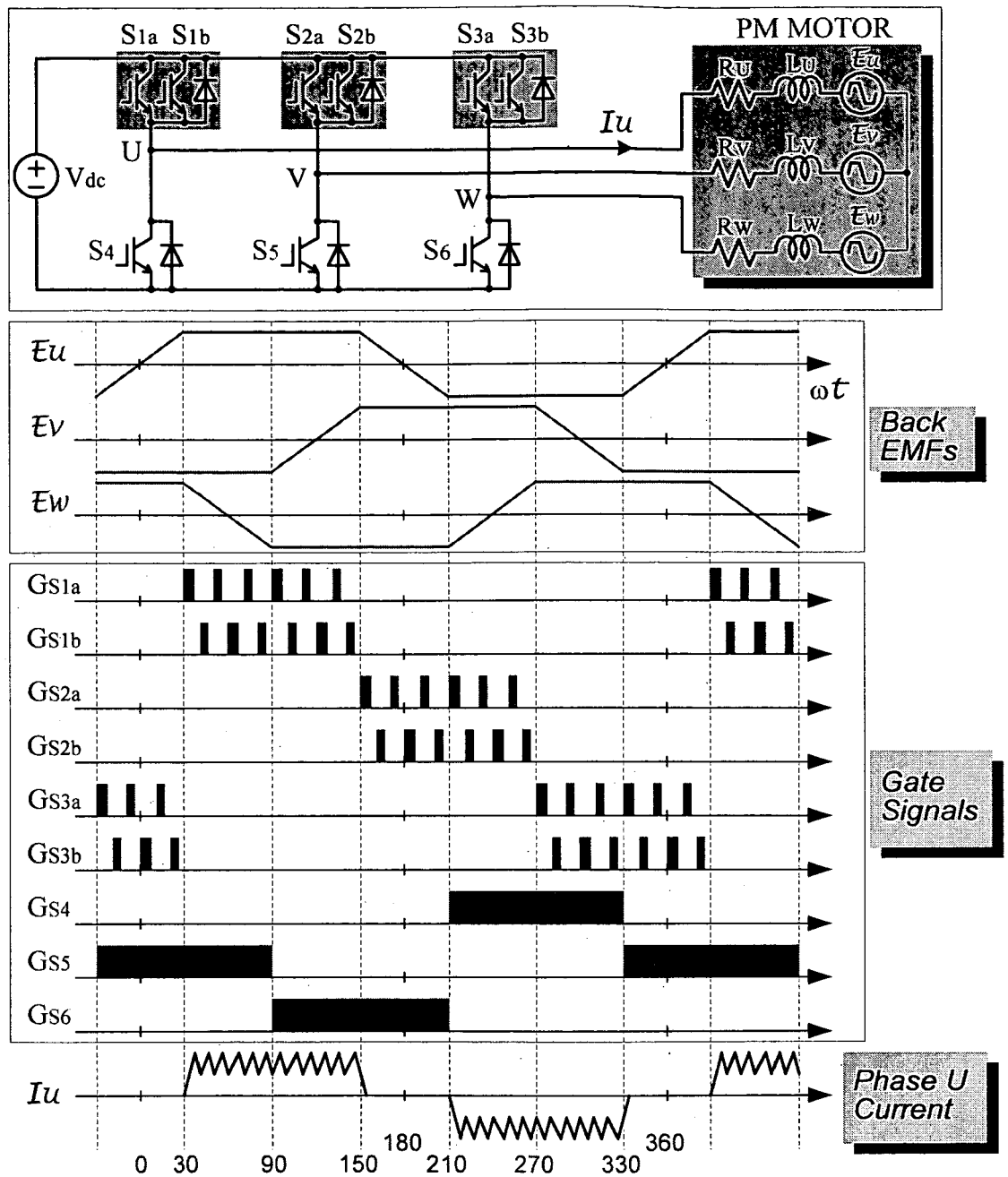
FIG. 3 is an example of the invention for brushless DC PM motor drive.

FIG. 3 shows an example of the invention for brushless direct current (BLDC) motor drives. The effective switching frequency is doubled by using two switching devices connected in parallel for the upper legs. The operating principle of the inverter can be explained by referring to the operating waveforms, also shown in the same figure, where $E_u$, $E_v$ and $E_w$ represent the motor back EMF, and $I_u$ is phase U motor current, respectively. For this BLDC motor drive only the upper devices of each phase leg need to perform PWM control while the lower devices keep conducting for a fixed duration of 120 electrical degrees to obtain quasi-square wave currents to match the trapezoidal back EMFs. An essential feature is that the two devices of each phase leg switch alternately for PWM control. If each device switches at fs, the effective switching frequency is doubled to 2 times fs for motor voltage and current as can be seen from the motor current waveform. While the figure shows an example where just one additional device is added to each leg, more devices can be added, thus further increasing the effective switching frequency. As a general rule, if "n" devices are put in parallel for each leg, the effective switching frequency is increased by a factor of "n".

Figure 4:
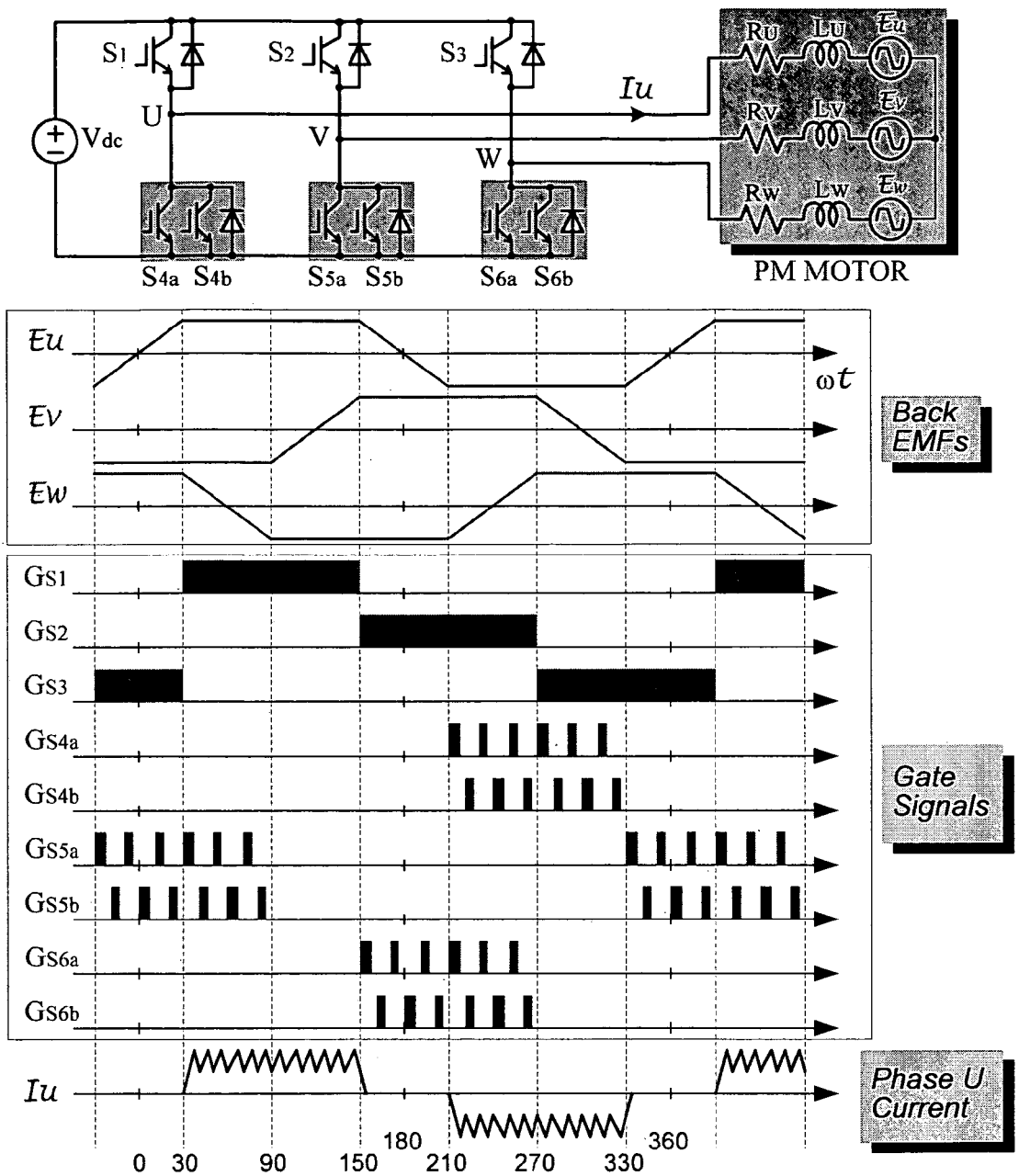
FIG. 4 is another example of the invention for brushless DC PM motor drive.

FIG. 4 shows an alternative configuration for BLDC motor drives, where additional devices are put to the lower legs. The rules of the upper and lower devices are reversed as compared to those of FIG. 3.

Figure 5:
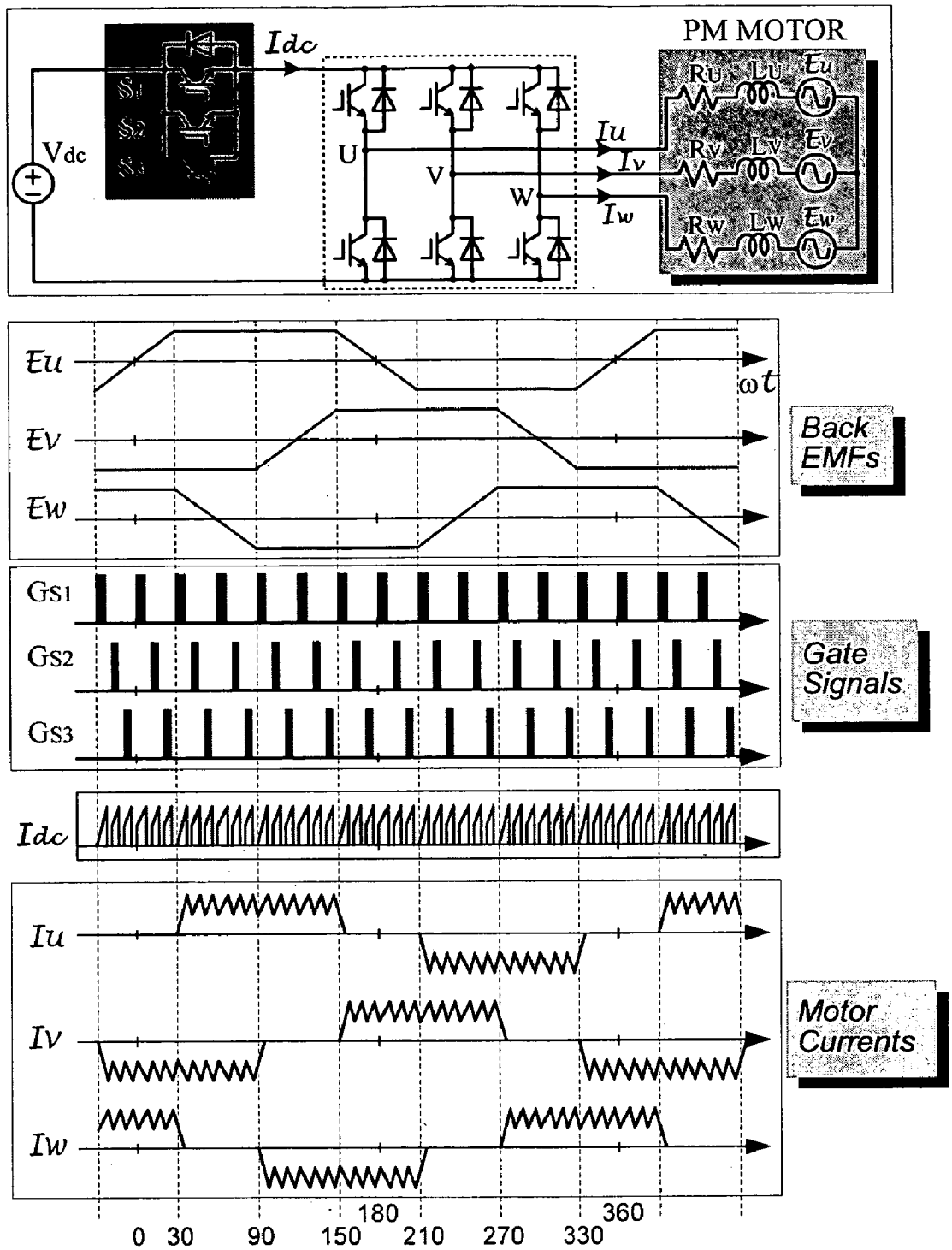
FIG. 5 is another example of the invention for brushless DC PM motor drive.

FIG. 5 shows another example of the invention for BLDC motor drives. Three devices connected in parallel are inserted into the DC bus of a standard bridge inverter. The three devices perform PWM control by switching alternately to regulate the motor current while the standard inverter works in a six-step fashion to sequentially commutate the motor phase currents. Consequently, the effective switching frequency is tripled.

Figure 6:
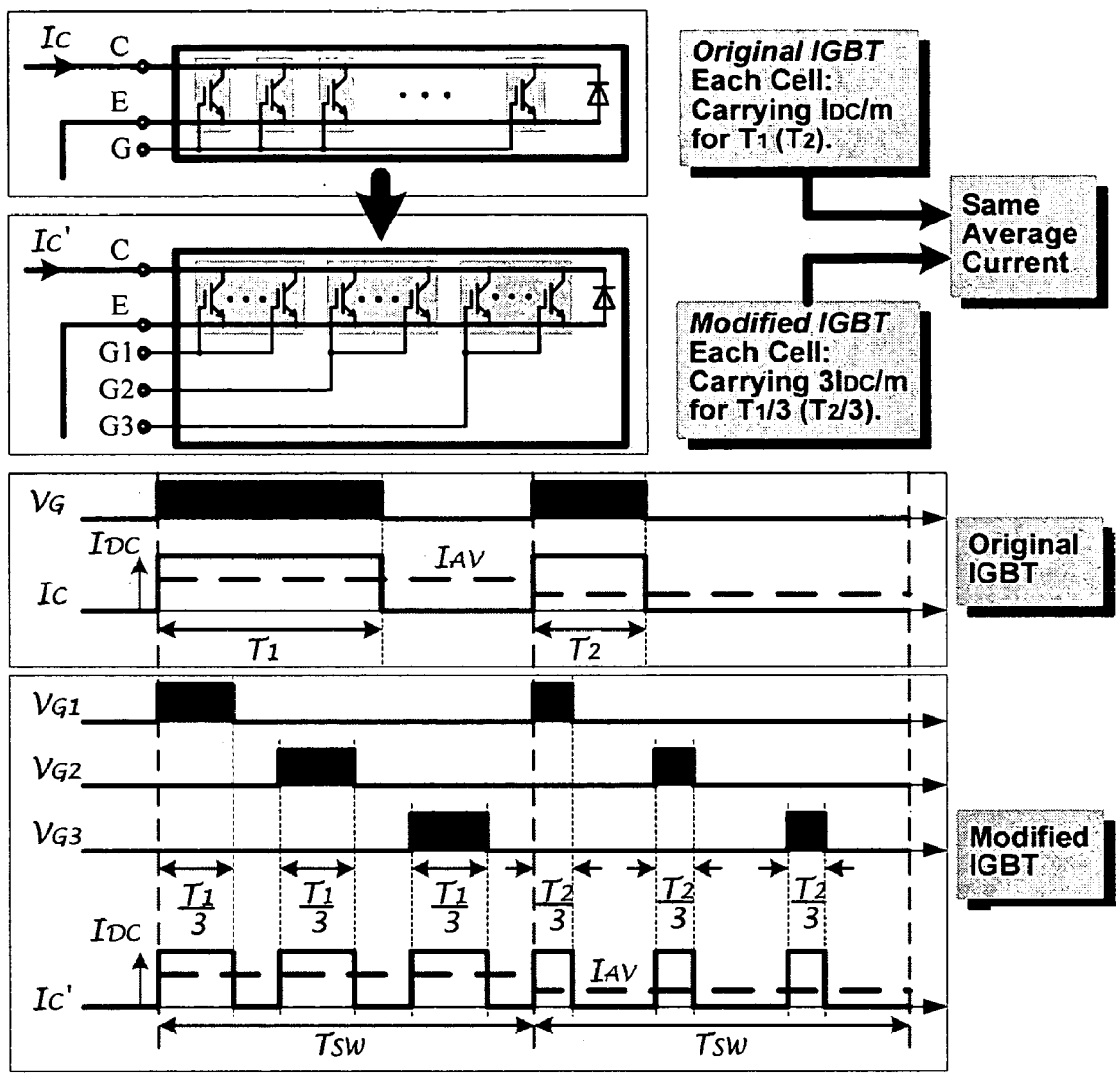
FIG. 6 is circuit modifications of IGBT modules for the invention.

Current existing IGBT modules can be modified to fit into the proposed inverters. An IGBT module is actually constructed by putting many IGBT cells in parallel to obtain a required current rating. FIG. 6 shows a typical IGBT module that contains m cells connected in parallel to form a single switching device. Since the control gates to all the cells are bundled together, they are gated on and off simultaneously. Because of the tolerance and imbalance among the cells, the switching frequency is limited to a lower value than individual cell's speed. By rearranging the cells into three groups, letting each group have a separate gate control, a module whose effective switching frequency can be tripled for the inverter of this invention is obtained. All gates for the three groups should be brought out separately by device manufactures to let users bundle them together outside according to their needs. In this way, cost increase incurred in the modification can be kept at minimum.

The gate control voltage and device current waveforms, shown in FIG. 6, illustrate how the modified module works. In the original module, all the m cells conduct at the same time and each cell carries 1/m of the total collector current $I_{DC}$ for a conduction period of $T_1$ (or $T_2$). Additionally, in the modified module the three groups of cells conduct alternately. So each cell carries 3/m of the collector current $I_{DC}$ but only for 1/3 of the conduction period of $T_1$ (or $T_2$). As a result, the average current $I_{AV}$ over a switching cycle $T_{sw}$ is same for each cell in both the modules. This means the modified module will have the same current rating as the original one.

Figure 7:
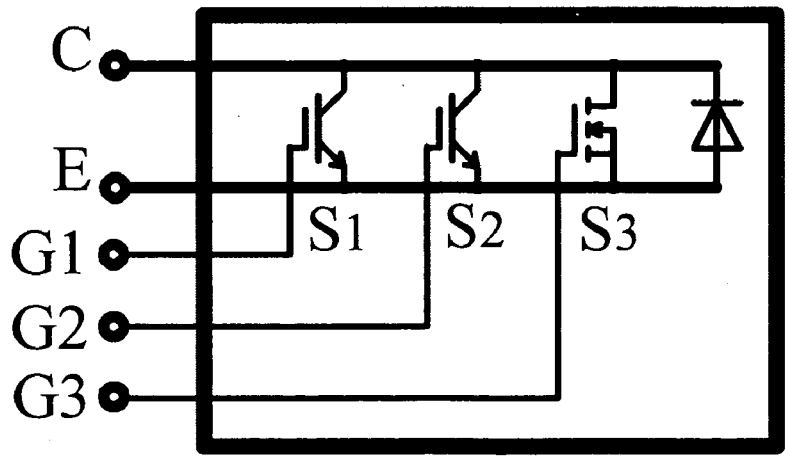
FIG. 7 is a switching device module consisting of two IGBTs and one MOSFET.

Different kinds of devices can also be put together to make a module for the invention. Since MOSFETs can switch at much higher frequency than IGBTs but have lower current ratings, by connecting MOSFETs and IGBTs in parallel and letting the MOSFETs produce the narrow pulses that the IGBTs cannot generate for PWM control, the PWM accuracy will improve and/or further increase the effective switching frequency beyond what IGBTs alone can realize. FIG. 7 shows an example of switching device module that consists of two IGBTs and one MOSFET. The use of this module in inverters that employ bipolar PWM can double the switching frequency and can more accurately regulate the current due to the improved accuracy of PWM control. Additionally, this module can be used in unipolar inverters to triple the effective switching frequency and improve the accuracy of current regulation.

Figure 8:
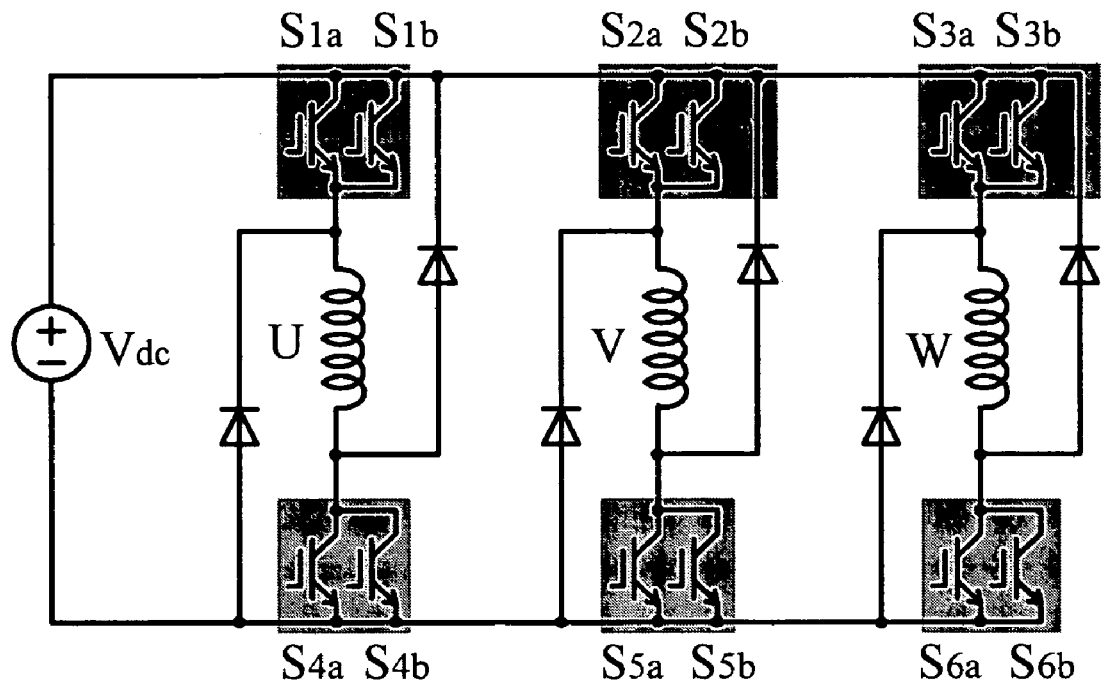
FIG. 8 is an example of the invention for switched reluctance motor drive.
Figure 9:
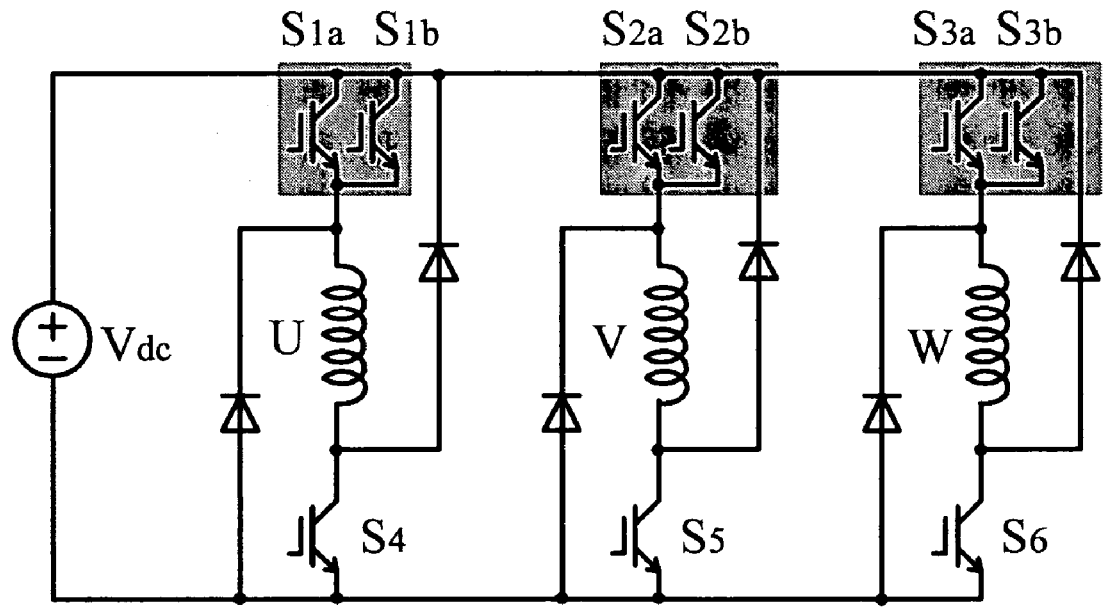
FIG. 9 is another example of the invention for switched reluctance motor drive.
Figure 10:
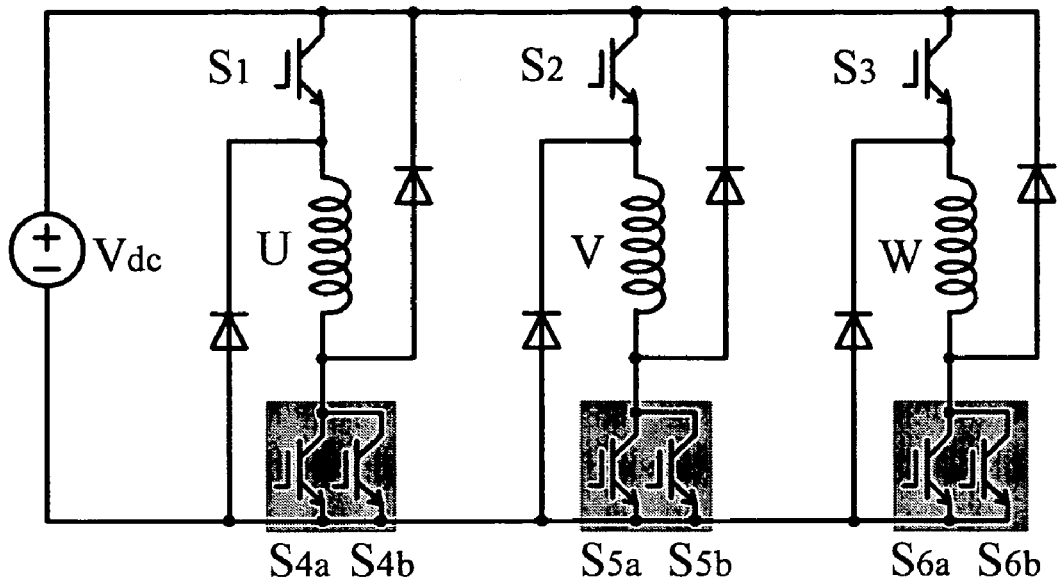
FIG. 10 is another example of the invention for switched reluctance motor drive.
Figure 11:
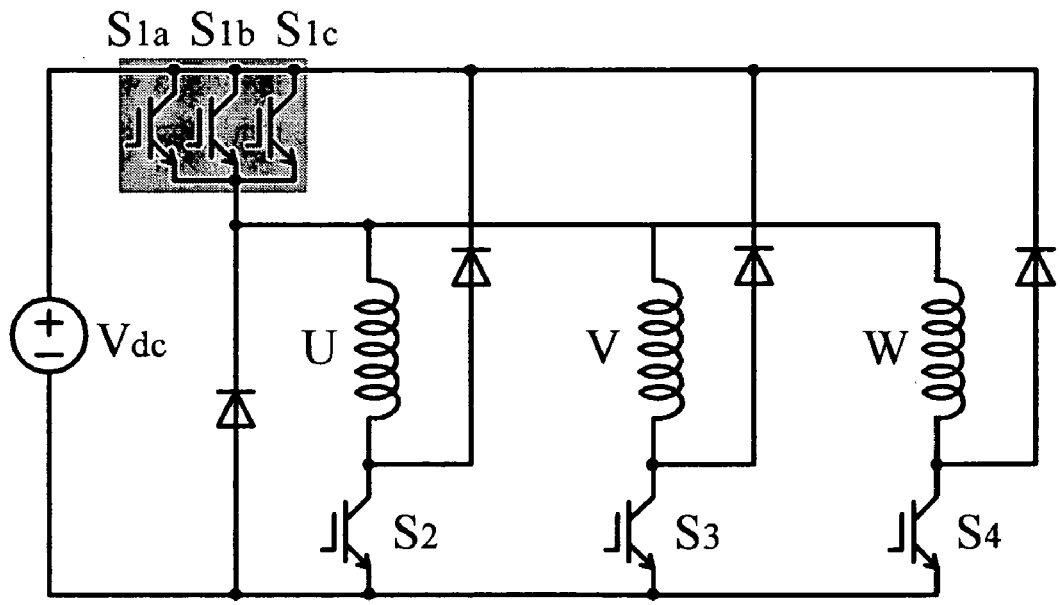
FIG. 11 is another example of the invention for switched reluctance motor drive.

The concept can also be applied to switched reluctance motor drives. FIG. 8 shows an example of the invention for switched reluctance motor drives that can double the effective switching frequency. FIGS. 9 and 10 show two alternative configurations. FIG. 11 shows another example of the invention for switched reluctance motor drives that can triple the effective switching frequency, but uses fewer number of switching devices. These inverters basically operate in the same way to control a reluctance motor as the existing topologies except that the switches connected in parallel switch alternately in performing pulse width modulation to increase the effective switching frequency and thus reduce motor current ripple.

The following publications are herein incorporated by reference:

[1] Juan W. Dixon and Boon T. Ooi, "Series and Parallel Operation of Hysteresis Current-Controlled PWM Rectifiers", *IEEE Transactions on Industry Applications*, vol. 25, no. 4, pp. 644-651, 1989.

[2] Nagataka Seki and Hiroshi Uchino, "Which is Better at a High Power Reactive Power Compensation System, High PWM Frequency or Multiple Connection?", *IEEE Industry Applications Society Annual Meeting Conference Record*, vol. 2, pp. 94-953, 1994

[3] I. Takahashi, T. Koganezawa, G. Su and K. Ohyama, "A Super High Speed PM Motor Drive System by a Quasi- Current Source Inverter," *IEEE Transactions on Industry Applications*, vol. 30, no. 3, pp. 683-690, 1994.

[4] Slobodan Vukosavic and Victor R. Stefanovic, "SRM Inverter Topologies: A Comparative Evaluation", *IEEE Transactions on Industry Applications*, vol. 27, no.6, pp.1034-1047, 1991.

While there has been shown and described what are at present considered the preferred embodiments of the invention, it will be obvious to those skilled in the art that various changes and modifications can be made therein without departing from the scope.

We claim:

1. A power inverter main circuit comprising;
   at least two pairs of parallel switching elements responsive to switching control signals, said at least two pairs of switching elements on each leg conducting alternately thereby conducting at most one half duty for a control period, wherein the control gates of said switching elements are electrically isolated from each other,
   means for applying single channel phase voltages to a polyphase load via said parallel switching elements wherein each phase voltage conductor is single point connected to the load side of said parallel switching elements, and
   means for alternately gating said parallel switching elements during a control period shared by said parallel switching elements thereby multiplying the effective switching frequency by the number of parallel switching elements.

2. A power inverter main circuit as recited in claim 1, wherein the polyphase load comprises a polyphase AC motor.

3. A power inverter main circuit as recited in claim 1, wherein the polyphase load comprises a permanent magnet motor.

4. A power inverter main circuit as recited in claim 1, wherein the polyphase load comprises at least one IGBT module.

5. A power inverter main circuit as recited in claim 1, wherein the polyphase load comprises at least one IGBT module and at least one MOSFET.

6. A power inverter main circuit as recited in claim 1, wherein the polyphase load comprises a switched reluctance motor.

7. A method of controlling drive of a polyphase load, comprising the steps of;
   applying single channel phase voltages to a polyphase load via at least two pairs of parallel switching elements wherein each phase voltage conductor is single point connected to the load side of said parallel switching elements, said at least two pairs of switching elements on each leg conducting alternately thereby conducting at most one half duty for a control period, and
   alternately gating said parallel switching elements during a control period shared by said parallel switching elements wherein the control gates of said switching elements are electrically isolated from each other, thereby multiplying the effective switching frequency by the number of parallel switching elements.

8. A method as recited in claim 1, wherein the polyphase load comprises a polyphase AC motor.

9. A method as recited in claim 1, wherein the polyphase load comprises a permanent magnet motor.

10. A method as recited in claim 1, wherein the polyphase load comprises at least one IGBT module.

11. A method as recited in claim 1, wherein the polyphase load comprises at least one IGBT module and at least one MOSFET.

12. A method as recited in claim 1, wherein the polyphase load comprises a switched reluctance motor.

* * * * *